(12) United States Patent
Shukla et al.

(10) Patent No.: US 9,019,428 B2
(45) Date of Patent: Apr. 28, 2015

(54) ELECTRONIC DEVICE CAMERA MODULE WITH ALIGNMENT STRUCTURES

(75) Inventors: Ashutosh Y. Shukla, Santa Clara, CA (US); Kenta K. Williams, Sunnyvale, CA (US); Shashikant G. Hegde, San Jose, CA (US); Tang Yew Tan, Palo Alto, CA (US); David A. Pakula, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 13/605,837

(22) Filed: Sep. 6, 2012

(65) Prior Publication Data

US 2014/0063265 A1 Mar. 6, 2014

(51) Int. Cl.
*G03B 13/18* (2006.01)
*H04N 5/225* (2006.01)
*H04N 17/00* (2006.01)

(52) U.S. Cl.
CPC ............... *G03B 13/18* (2013.01); *H04N 5/225* (2013.01); *H04N 17/00* (2013.01); *H04N 5/2257* (2013.01)

(58) Field of Classification Search
CPC ... H04N 5/225; H04N 5/2257; H04N 5/2253; G03B 13/18
USPC .............. 348/294, 208.1, 239, 335, 340, 373, 348/374, 187, 190; 396/55, 133, 144, 529, 396/535; 359/811, 819, 823, 824; 257/432–434, 680
See application file for complete search history.

(56) References Cited

U.S. PATENT DOCUMENTS

| | | | |
|---|---|---|---|
| 7,593,636 B2 | 9/2009 | Nystrom et al. | |
| 8,285,080 B2 * | 10/2012 | Mizuno | 382/299 |
| 2006/0189216 A1 | 8/2006 | Yang | |
| 2008/0169437 A1 * | 7/2008 | Chang | 250/515.1 |
| 2010/0141830 A1 * | 6/2010 | Zhang | 348/374 |
| 2011/0026144 A1 * | 2/2011 | Shyu et al. | 359/819 |
| 2011/0221907 A1 | 9/2011 | Smart et al. | |
| 2011/0255000 A1 * | 10/2011 | Weber et al. | 348/374 |
| 2012/0140344 A1 * | 6/2012 | Huang | 359/824 |
| 2012/0140346 A1 * | 6/2012 | Wu et al. | 359/824 |
| 2012/0141114 A1 | 6/2012 | Gooi et al. | |
| 2013/0242181 A1 * | 9/2013 | Phoon et al. | 348/374 |

FOREIGN PATENT DOCUMENTS

EP 1953903 8/2008

* cited by examiner

*Primary Examiner* — Nhan T Tran
(74) *Attorney, Agent, or Firm* — Treyz Law Group; G. Victor Treyz; Joseph F. Guihan

(57) ABSTRACT

An electronic device may include a camera module. Control circuitry within the electronic device may use an image sensor within the camera module to acquire digital images. The camera module may have lens structures that are supported by lens support structures such as a lens barrel and lens carrier. An actuator such as a voice coil motor may control the position of the lens support structures relative to internal support structures such as upper and lower spacer members. Springs may be used to couple the lens support structures to the internal support structures. Outer wall structures in the camera module such as a ferromagnetic shield structures may surround and enclose at least some of the internal support structures. The outer wall structures may have openings. The internal support structures may have pins or other alignment structures that protrude through the openings.

20 Claims, 15 Drawing Sheets

ELECTRONIC DEVICE CAMERA MODULE WITH ALIGNMENT STRUCTURES

BACKGROUND

This relates generally to electronic devices, and more particularly, electronic devices having camera modules.

Electronic devices such as portable computers, tablet computers, and cellular telephones are often provided with camera modules. The camera modules include digital image sensors and additional structures such as a lens and autofocus structures.

It may be challenging to provide camera modules that are as compact as desired and that are satisfactorily aligned with respect to device housing structures. In some situations, a camera module may be mounted with a bulky bracket that introduces a possible source of misalignment between the camera module and other device structures. To accommodate potential misalignment, camera window structures may need to be enlarged. This may allow stray light to enter a device and degrade image quality. Mounting structures such as brackets may also consume more volume than desired in an electronic device, making it difficult to reduce the size of the device.

It would therefore be desirable to be able to provide improved ways of installing camera modules in electronic devices.

SUMMARY

An electronic device may include a camera module. Control circuitry within the electronic device may use an image sensor within the camera module to acquire digital image data.

The camera module may have lens structures that are supported by lens support structures such as a lens barrel and lens carrier. An actuator such as a voice coil motor may control the position of the lens support structures relative to internal support structures such as upper and lower spacer members. During operation, the control circuitry may adjust the actuator to focus light that is passing through the lens structures onto the image sensor. Springs or other flexible coupling structures may be used to couple the lens support structures to the internal support structures.

Outer wall structures in the camera module such as ferromagnetic shield structures may surround and enclose at least some of the internal support structures. The outer wall structures may have a lip that serves as a stop to arrest motion of the lens support structures. The lip of the ferromagnetic shield structures may have openings. The internal support structures may have pins or other alignment structures that protrude through the openings.

The electronic device may include structures with alignment features that mate with the alignment structures on the internal camera module support structures. The alignment features may be formed from recesses that are configured to receive the pins that are protruding through the openings in the ferromagnetic shield structures. The alignment features in the electronic device may be formed as part of a housing wall, as part of an alignment ring that surrounds a camera window opening and that is mounted on the inner surface of a display cover glass, as part of a camera window trim structure, or as part of other structures in the electronic device.

After a camera module has been assembled, test equipment may be used to measure how much the image sensor is offset with respect to the alignment structures. The test equipment may determine, for example, that the image sensor is tilted. Calibration data may be generated to compensate for the measured offset of the image sensor in a camera module. Following assembly of a camera module into an electronic device, the calibration data for that camera module may be loaded into control circuitry within the electronic device so that the control circuitry can rotate acquired digital images by an amount that compensates for the measured tilt.

Further features of the invention, its nature and various advantages will be more apparent from the accompanying drawings and the following detailed description of the preferred embodiments.

DETAILED DESCRIPTION

Figure 1:
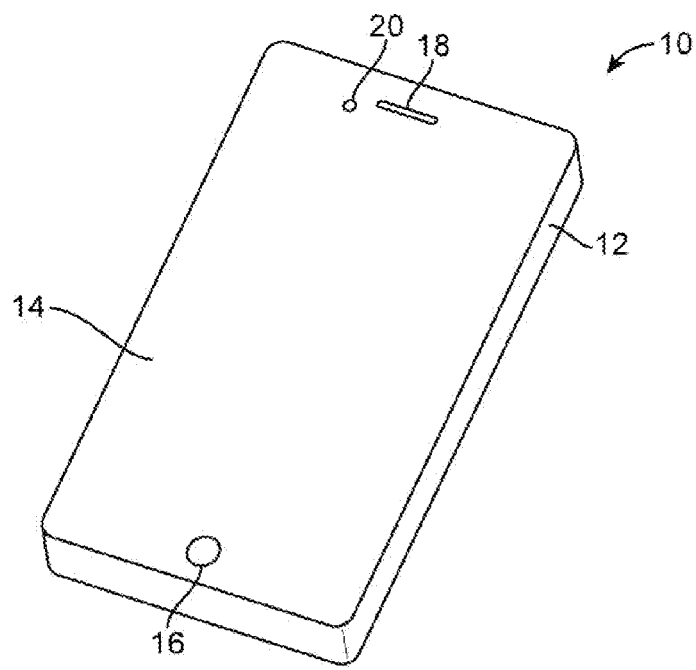
FIG. 1 is a front perspective view of an illustrative electronic device of the type that may include a camera module in accordance with an embodiment of the present invention.

Electronic devices such as electronic device 10 of FIG. 1 may be provided with camera modules. Digital images may be captured using a camera module. There may be any suitable number of camera modules in device 10. For example, there may be one camera module in the camera systems of device 10, there may be two camera modules in device 10, or there may be three or more camera modules in device 10 (as examples).

Device 10 of FIG. 1 may be portable electronic equipment such as a cellular telephone, a tablet computer, a media player, a wrist-watch device, a pendant device, an earpiece device, a notebook computer, other compact portable devices, or other electronic equipment such as a computer monitor with an integrated computer, a computer monitor, a desktop computer, a set-top box, or a television.

Device 10 of FIG. 1 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. Housing 12 may be formed from a unibody structure (e.g., a structure that is machined from a single piece of material) or may include internal frame structures and exterior wall structures (as examples). Other types of housing construction may also be used if desired.

Device 10 may, if desired, have a display such as display 14. Display 14 may be a touch screen that incorporates touch sensitive structures such as capacitive touch electrodes or display 14 may be touch insensitive. Display 14 may include display pixels formed from light-emitting diodes (LEDs), organic LEDs (OLEDs), plasma cells, electrophoretic display elements, electrowetting display elements, liquid crystal display (LCD) components, or other suitable display pixel structures. A cover layer such as a layer of glass or clear plastic may cover the surface of display 14. Buttons and speaker port openings may pass through openings in the cover glass. For example, the cover layer for display 14 may have an opening for a front-facing button such as button 16 and a speaker opening such as speaker port opening 18.

Portions of display 14 may form active regions (i.e., regions in which the display pixels of display 14 form images for a user). Portions of display 14 may also form inactive regions (e.g., peripheral portions of display 14 that to not have any active display pixels). Camera window structures such as camera window structure 20 may be provided in the cover layer for display 14 (e.g., to form a front-facing camera). The camera windows structures may be formed from transparent materials such as glass, plastic, or other transparent materials.

Camera window 20 of FIG. 1 may, for example, be formed in an inactive portion of display 14. The display cover layer in the inactive portion of display 14 may be provided with an opaque masking layer such as a layer of black ink. Camera window 20 may be formed from an opening in the opaque masking layer.

Figure 2:
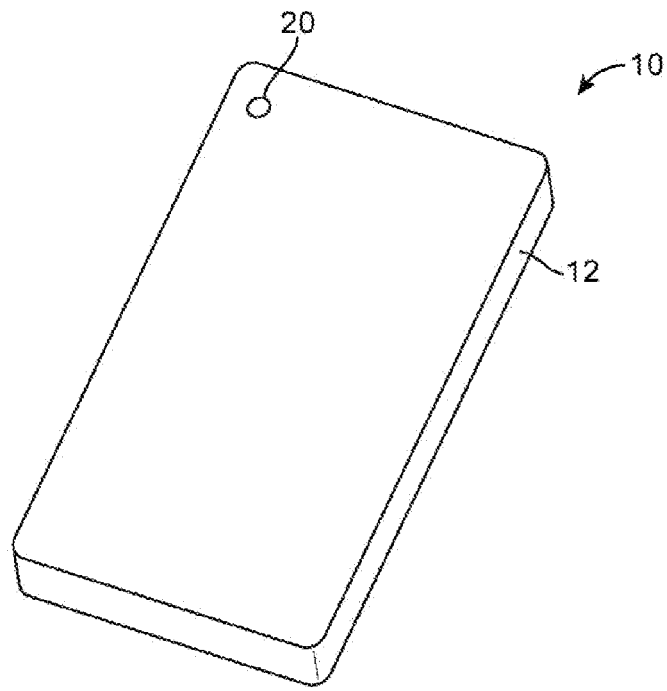
FIG. 2 is a rear perspective view of an illustrative electronic device of the type that may include a camera module in accordance with an embodiment of the present invention.

If desired, camera windows 20 may be formed elsewhere in device housing 12. As shown in the rear perspective view of device 10 of FIG. 2, for example, camera window 20 may be formed on the rear surface of housing 12 (e.g., to form a rear-facing camera).

Figure 3:
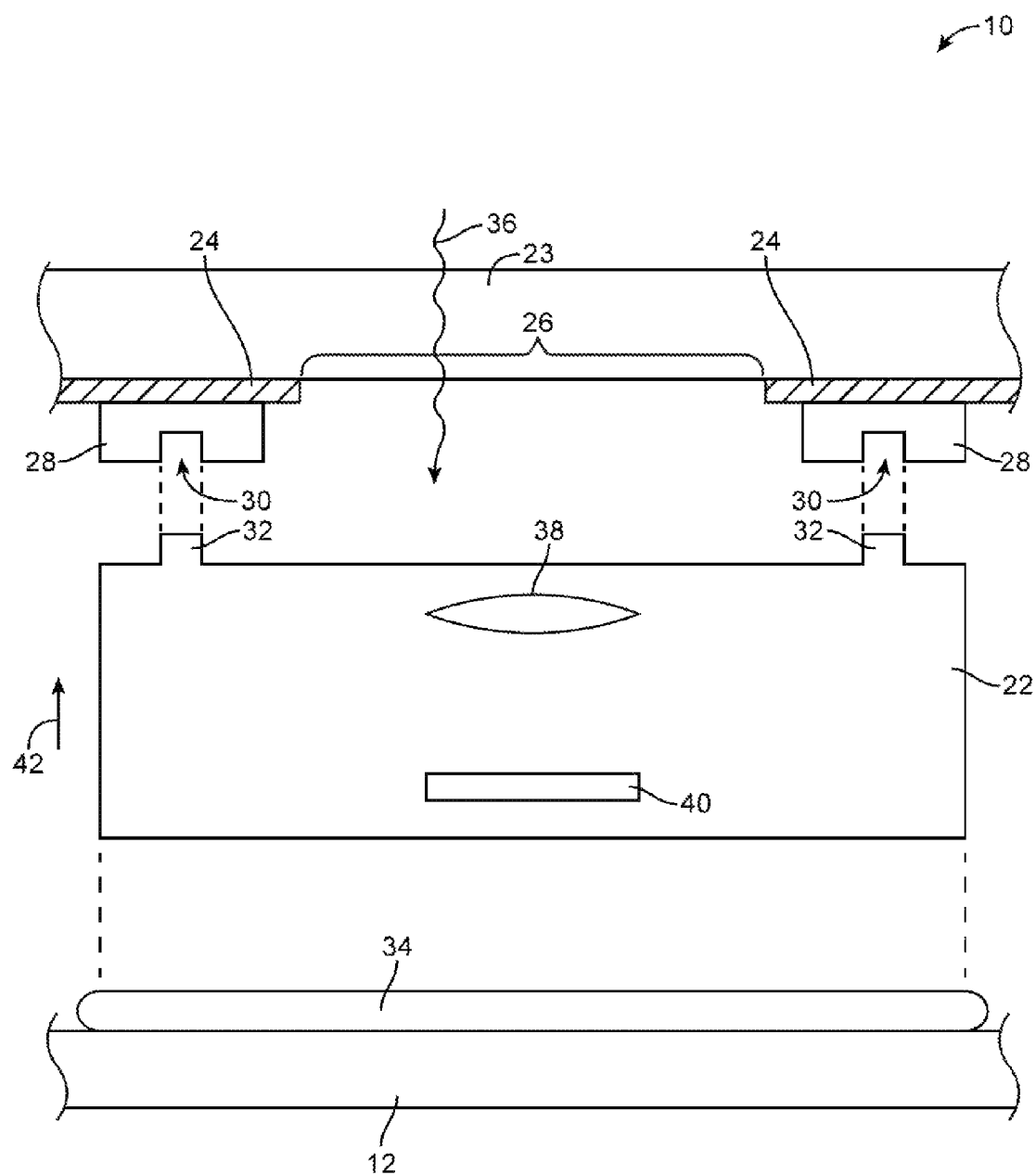
FIG. 3 is a cross-sectional side view of an illustrative electronic device with a camera module that is aligned with respect to alignment features formed from recessed portions of an alignment ring mounted on a display cover layer in accordance with an embodiment of the present invention.

FIG. 3 is a cross-sectional side view of electronic device 10 showing how device 10 may include a camera module such as camera module 22. As shown in FIG. 3, device 10 may include a display cover layer such as display cover layer 23. Display cover layer 23 may be a transparent sheet of material that covers the surface of display 14 of FIG. 1. Display cover layer 23 may be formed from a material such as clear glass or plastic (as examples). In inactive portions of display 14 such as the end portions of display 14 at the top and bottom of device 10 of FIG. 1, the underside of display cover layer 23 may be covered with an opaque masking material such as black ink 24. Opening 26 may be formed in black ink layer 24 to serve as a camera window for camera module 22. Camera module 22 may be aligned with opening 26 so that light 36 from an image subject may pass through opening 26 to camera module 22. Camera module 22 may include one or more lenses such as lens structures 38 and may include a digital image sensor such as image sensor 40 onto which light 36 that has passed through lens structures 38 is focused. Using lens structures 38 and image sensor 40, camera module 22 may generate digital image data corresponding to image light 36.

When assembled into a finished device, camera module 22 may be pressed upwards in direction 42 by housing 12 and optional biasing structures such as elastomeric structure 34. Elastomeric structure 34 may be formed from a silicone pad, foam, springs, or other biasing structures.

When biased towards display cover layer 23 by biasing structures 34, alignment features 32 on camera module 22 may mate with corresponding alignment features such as alignment features 30 on structures such as alignment structures 28. Alignment structures 32 may be pins or other protruding structures and alignment structures 30 may be mating recesses or other recessed structures (as an example). Adhesive or other suitable attachment mechanisms may be used to attach alignment structures 28 to display cover layer 23. Alignment structures 28 may, as an example, have the shape of a ring. The ring may have a circular opening that is aligned with circular opening 26 in black ink layer 24 and may surround opening 26. Alignment structures 28 and the structures in camera module 22 such as alignment structures 32 may be formed from plastic, ceramic, glass, metal, fiber-based composites, other materials, or a combination of these materials.

Using vertically protruding pins as camera module alignment structures in a configuration of the type shown in FIG. 3 allows camera module 22 to be aligned with respect to alignment ring 28 and other structures in device 10 without using excessively bulky mounting bracket structures surrounding the sides of camera module 22. Pins 32 or other camera module alignment structures can also be formed as integral portions of internal camera module structures, thereby enhancing alignment accuracy.

Figure 4:
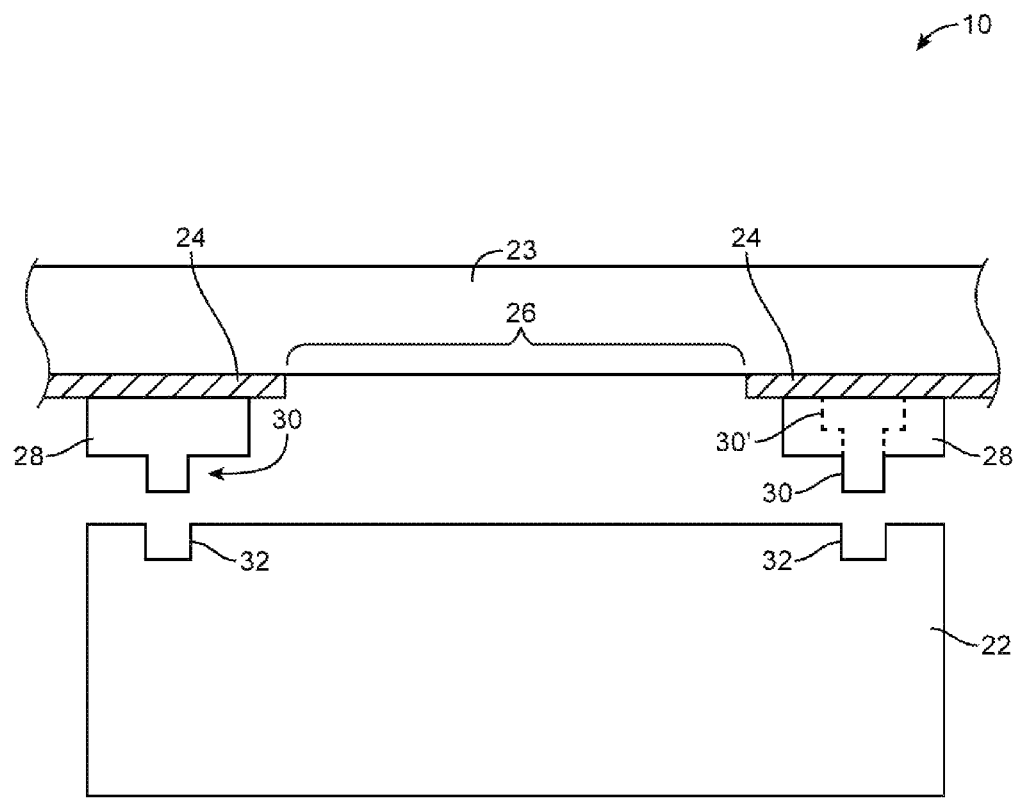
FIG. 4 is a cross-sectional side view of an illustrative electronic device with a camera module that is aligned with respect to protruding portions of an alignment ring mounted on a display cover layer in accordance with an embodiment of the present invention.

As shown in FIG. 4, alignment features 30 on alignment ring 28 may be formed from protruding portions of alignment ring 28. As shown by illustrative metal structure 30', alignment features 30 may, if desired, be formed from metal structures that are molded within alignment ring 28 (e.g., by insert molding) or may be formed from screws, pins, or other metal structures that are separate from alignment ring 28. For example, alignment ring 28 may have holes through which screws pass. The screws may have threaded shafts that are received in threaded bores in camera module 22. Following attachment of alignment ring 28 to camera module 22 using screws, alignment ring 28 may be attached to display cover layer 23 using adhesive (as an example). In configurations in which alignment features 30 have protruding shapes of the type shown in FIG. 4, corresponding alignment features 32 may have the shapes of recesses in the structures of camera module 22. Alignment feature arrangements may also be used in which ring 28 or other alignment structures on display cover layer 23 have a combination of recessed and protruding regions and mating alignment structures on camera module 22 have a combination of protruding and recessed regions.

Figure 5:
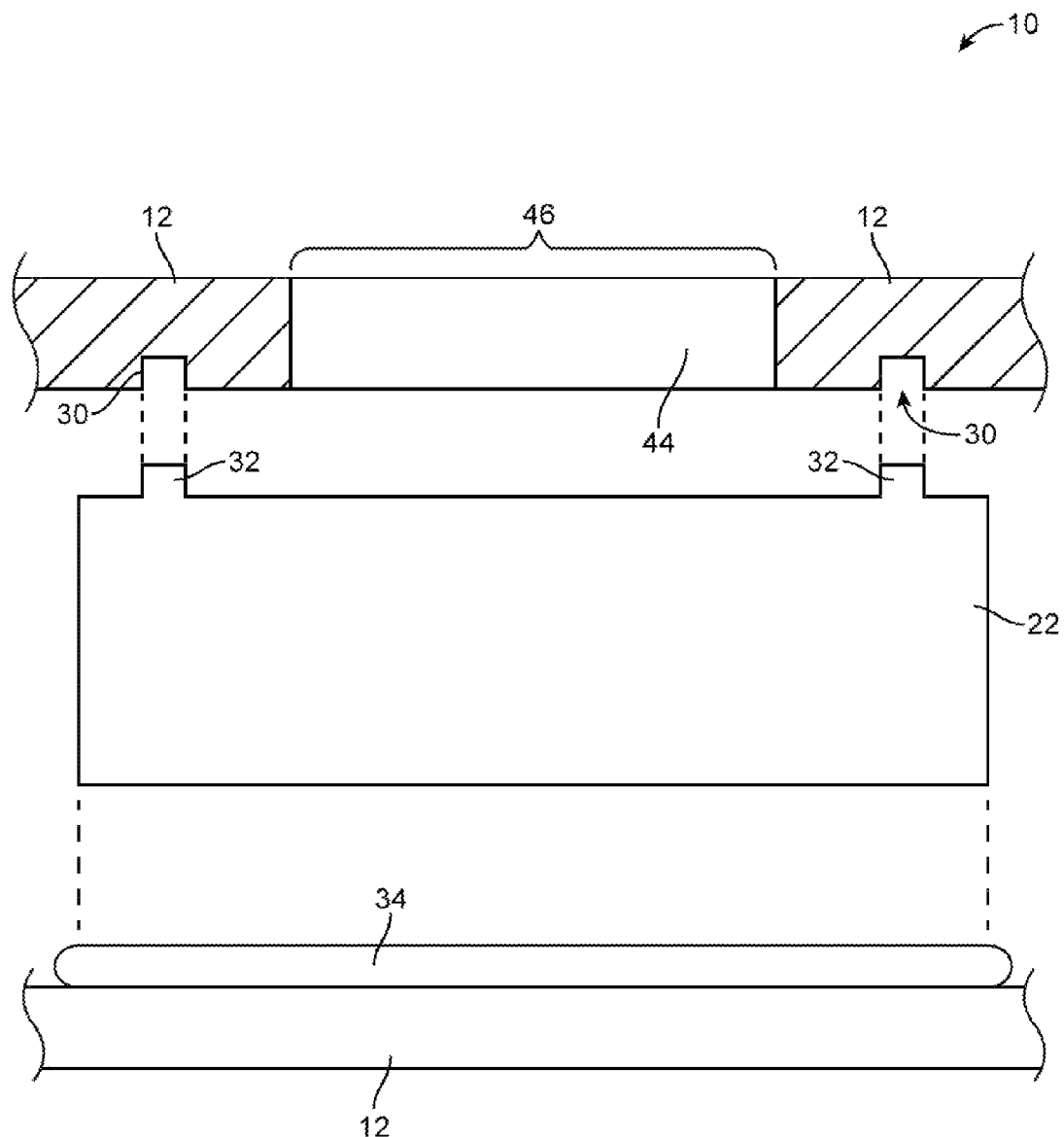
FIG. 5 is a cross-sectional side view of an illustrative electronic device with a camera module that is aligned to a window in a device housing recesses in the device housing that serve as camera module alignment features in accordance with an embodiment of the present invention.

In the illustrative configuration of FIG. 5, device 10 has a camera window such as camera window 46 that has been formed in a wall of housing 12. Camera window 46 of FIG. 5 may be, for example, a camera window such as rear housing surface camera window 20 of FIG. 2. As shown in FIG. 5, camera window 46 may be formed from a clear structure such as camera window structure 44 that is mounted within an opening in housing 12. Camera window structure 44 may be a glass or plastic disk or other transparent member. Adhesive, fasteners, or other mounting structures may be used in attaching transparent camera window member 44 to housing 12.

Camera window structure 44 allows light from an image to reach camera module 22. Camera module 22 and housing 12 may have mating alignment features. For example, housing 12 may have integral alignment features such as protrusions or recesses that mate with camera module alignment features. As shown in FIG. 5, for example, housing 12 (e.g., a plastic, glass, metal, or fiber-composite housing wall) may be provided with alignment features such as recesses 30 that mate with corresponding camera module alignment features 32 such as protrusions (e.g., alignment pins).

Figure 6:
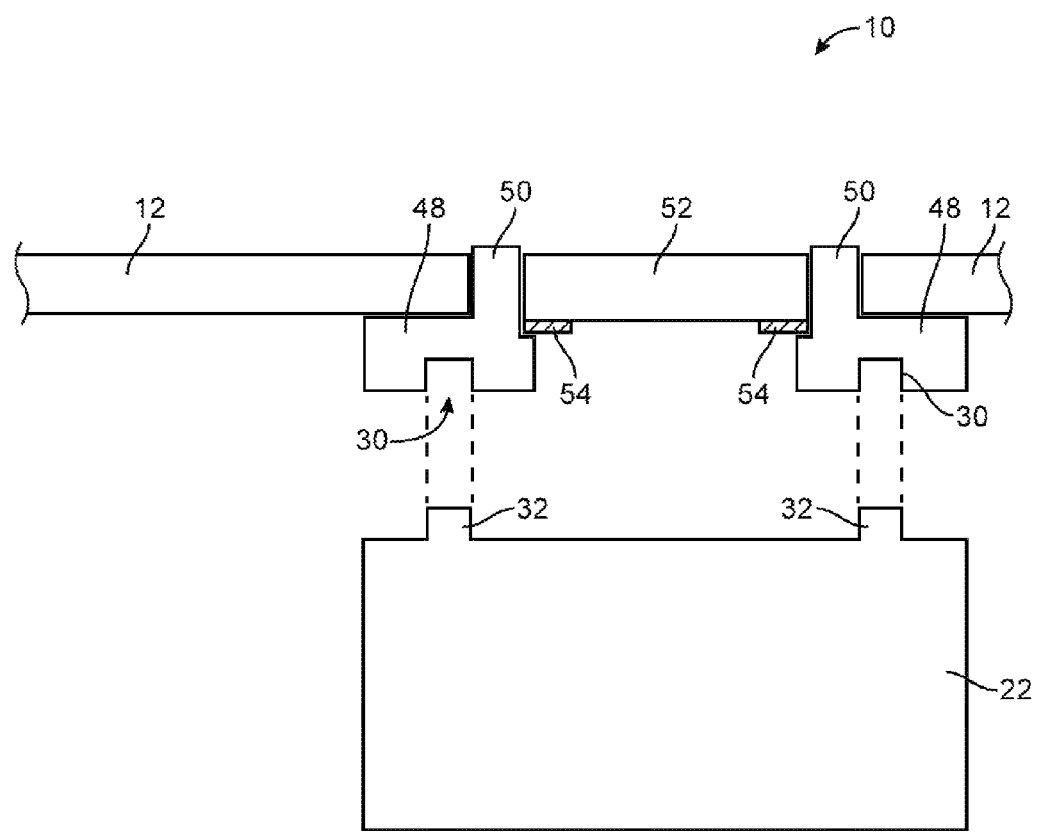
FIG. 6 is a cross-sectional side view of an illustrative camera module and associated camera window trim structures having mating alignment features in accordance with an embodiment of the present invention.

If desired, camera windows in device 10 can be formed using trim structures such as camera window trim 48 of FIG. 6. Camera window trim structure 48 may be formed from plastic, metal, glass, fiber-based composites, or other suitable materials. Camera window trim structure 48 may have a circular opening or an opening of other suitable shapes for receiving camera window member 52. Camera window member 52 may be a piece of glass, plastic, or other transparent camera window structure. For example, camera window member 52 may be a clear disk-shaped glass or plastic structure that is received within a mating circular recess within camera trim structure 48. Camera trim structures 48 may be used in mounting camera window member 52 within an opening in housing 12. Camera trim structure 48 may have protruding portions such as portions 50 that are visible from the exterior of device 10 and that surround camera window member 52. Portions 50 may, for example, for a circular trim for window 52 in configurations in which camera window member 52 has a disk shape. A ring-shaped layer of black ink or other opaque masking material 54 may be provided around the peripheral edge of camera window member 52.

Portions of camera window trim structures 48 may be configured to serve as alignment features that mate with corresponding alignment features on camera module 22. As an example, camera module 22 may have pins or other protruding camera module alignment features 32 and camera window trim structures 48 may have mating alignment structures such as recesses 30. Configurations in which camera module 22 has recessed alignment features and camera window trim structure 48 has mating protruding alignment features may also be used. Adhesive or other attachment mechanisms may be used to attach camera window trim 50 and camera window member 52 to housing 12.

Figure 7:
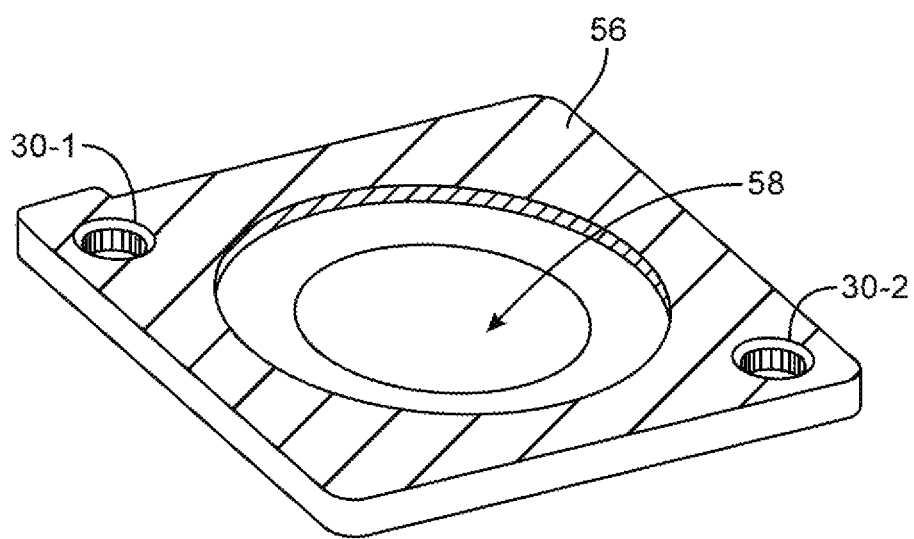
FIG. 7 is a perspective view of an illustrative structure with alignment features configured to mate with alignment features on a camera module in accordance with an embodiment the present invention.

FIG. 7 is a perspective view of illustrative alignment structures of the type that may be used in receiving alignment features such as protruding portions 32 on camera module 22. Alignment structures 56 may, as an example, be used as an alignment ring such as alignment ring 28 of FIG. 3 and alignment ring 28 of FIG. 4. As shown in FIG. 7, alignment structures 56 may have an opening such as opening 58 for receiving a circular (disk-shaped) camera window member. Openings 30-1 and 30-2 may be used in forming alignment structures 30. Opening 30-1 may be a hole with a circular shape for receiving a mating circular pin 32 on camera module 22. Opening 30-2 may have a slot-shaped opening (e.g., a rectangular slot shape with rounded corners). The use of a slot or other laterally elongated opening shape for opening 30-2 provides extra clearance to help ensure that pins 32 will be successfully received within openings 30-1 and 30-2.

Protruding alignment features such as pins 32 on camera module 22 may pass through an opening in an outer structure on module 22 such as outer wall structure 60. Outer wall structures 60 may form a camera module housing wall or other structure that surrounds and encloses at least some of the internal parts of camera module 22. In configurations in which camera module 22 uses an electromagnetically actuated focusing system (e.g., an actuator such as a voice coil motor that is based on a coil of wire and permanent magnets or other electromagnetic actuator), outer wall structures 60 may be an electromagnetic shield structure and may be formed from a ferromagnetic metal (e.g., a sheet of steel coated with one or more layers of additional metals). The ferromagnetic metal may allow structures 60 to serve as a shield that helps direct and confine electromagnetic fields from coil and magnet structures within camera module 22.

Figure 8:
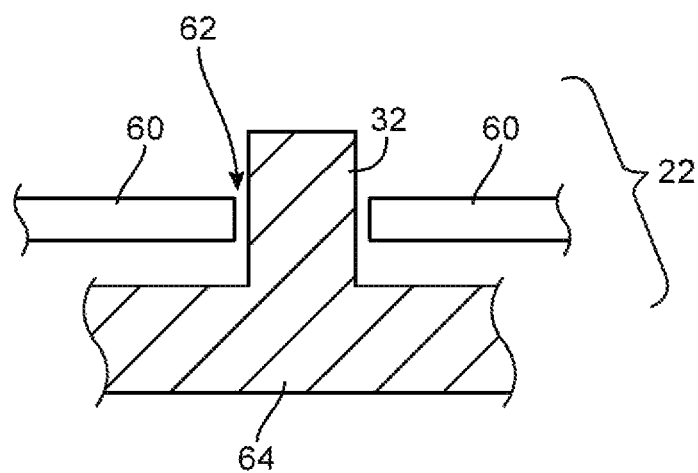
FIG. 8 is a cross-sectional side view of a portion of a camera module having a shield with an opening through which an alignment pin passes in accordance with an embodiment of the present invention.

As shown in FIG. 8, camera module wall structures 60 may have openings such as opening 62 through which protruding portions of camera module 22 such as pin 32 may protrude. Pin 32 may be coupled to internal camera module structures such as internal structures 64. Internal structures 64 may, in turn, form support structures for a lens barrel and other internal camera module structures. By allowing pins 32 to protrude through opening 62 in camera module wall 60, pins 32 can engage directly with mating alignment features in device 10, thereby enhancing alignment accuracy.

Figure 9:
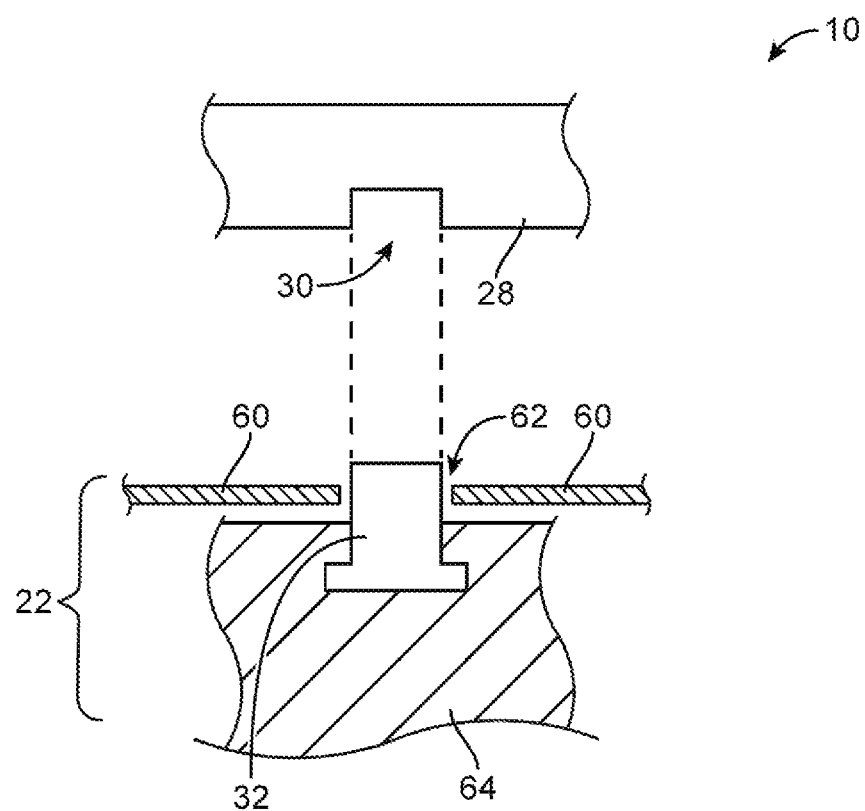
FIG. 9 is a cross-sectional side view of an illustrative camera module alignment pin formed from an insert molded metal part in accordance with an embodiment of the present invention.

In the illustrative configuration of FIG. 8, pins 32 have been formed as portions of internal camera structures 64. Structures 64 may be plastic support structures and pins 32 may be plastic protrusions that are formed as integral portions of structures 64. As shown in FIG. 9, pins 32 may, if desired, be formed from a material that is different than the material used in forming internal structures 64. For example, pins 32 may be formed from metal and internal structures 64 may be formed from plastic. To hold pins 32 in place within structures 64, structures 64 may be formed by injection molding plastic around the base portion of pins 32 (i.e., pins 32 may be attached to structures 64 using insert molding techniques).

Figure 10:
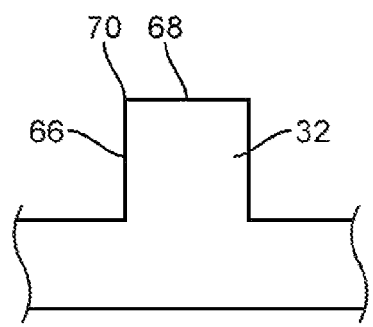
FIG. 10 is a cross-sectional side view of an illustrative camera module alignment pin with straight edges in accordance with an embodiment of the present invention.
Figure 11:
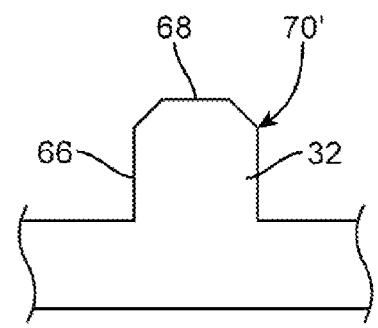
FIG. 11 is a cross-sectional side view of an illustrative camera module alignment pin with a beveled edge in accordance with an embodiment of the present invention.

Pins 32 may have a cross-sectional shape with straight sidewalls 66 and a planar upper surface 68, as shown in FIG. 10. Sidewalls 66 may meet upper surface 68 at right-angled corners 70. FIG. 11 shows how pin 32 may be provided with a chamfered corner along chamfered peripheral edge 70' to facilitate insertion of pin 32 into mating recess 30 in structures associated with device housing 12 (e.g., alignment structures, trim structures, or integral housing wall structures).

Figure 12:
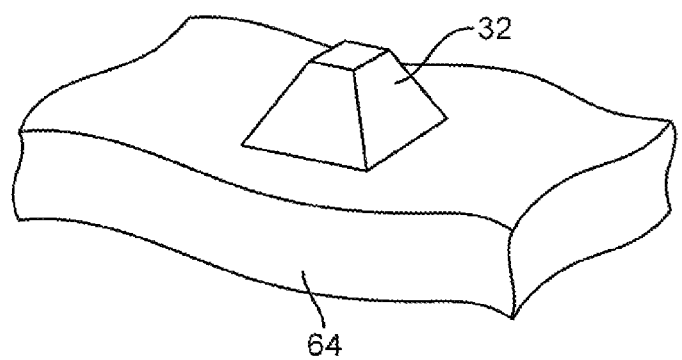
FIG. 12 is a perspective view of an illustrative camera module alignment structure in accordance with an embodiment of the present invention.
Figure 13:
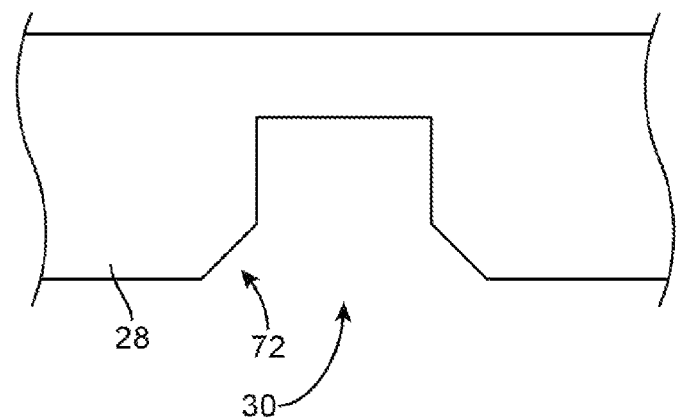
FIG. 13 is a cross-sectional side view of an illustrative camera module alignment recess with a beveled edge portion in accordance with an embodiment of the present invention.

FIG. 12 is a perspective view of an illustrative pyramid-shaped structure of the type that may be used in forming pins 32. As shown in FIG. 13, mating alignment features on device housing 12 such as recess 30 may, if desired be provided with a cross-sectional shape having sloped wall portions such as chamfered edge 72. Alignment features 30 and 32 may be provided with other shapes if desired. The illustrative configurations of FIGS. 10, 11, 12, and 13 are merely illustrative.

Figure 14:
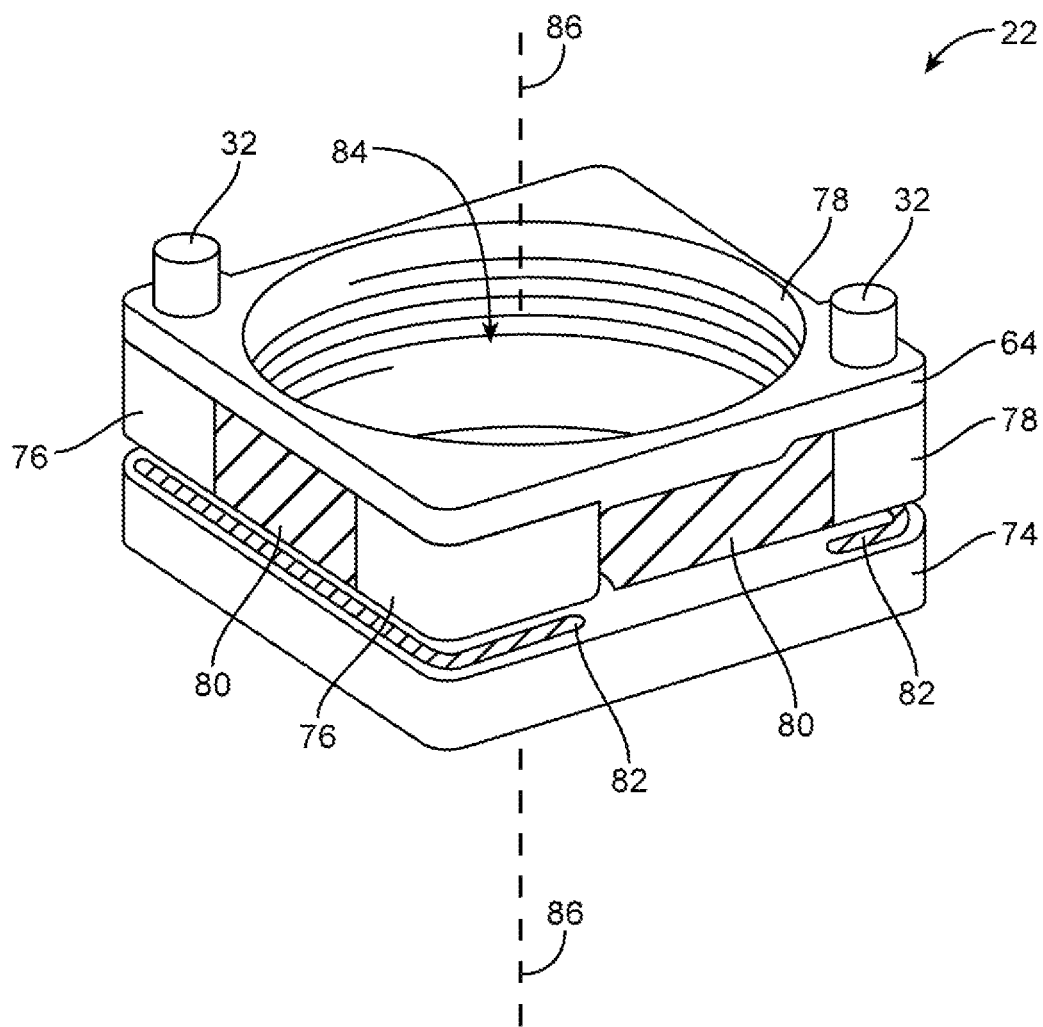
FIG. 14 is a perspective view of interior portions of a camera module in accordance with an embodiment of the present invention.

Illustrative internal camera module structures for camera module 22 (i.e., structures not covered by outer wall structures 60) are shown in FIG. 14. As shown in FIG. 14, camera module 22 may have structures such as lower support member 74 and upper support member 64. Lower support member 74, which may sometimes be referred to as a lower spacer, may be formed from a material such as plastic. Upper support member 64, which may sometimes be referred to as an upper spacer, may also be formed from a material such as plastic. Opening 84 in upper support member 64 may be used to receive lens structures such as one or more lenses mounted in a threaded lens barrel.

The lens structures of camera module 22 may be held in place using springs or other flexible structures that allow the lens structures to move relative to support structures such as upper support member 64 and lower support member 74. For example, lenses may be mounted within a lens barrel that is screwed into a corresponding lens carrier. The lens carrier may be mounted for movement relative to members 64 and 74 using structures such as upper spring structures 78 on member 64 and lower spring structures 82 on member 74.

During operation, the lens carrier may be moved back and forth along lens axis 86 to focus camera module 22. Springs 78 and 82 may support the lens carrier while allowing the lens carrier to move along axis 86. Camera module 22 may position the lens carrier and the lenses within the lens carrier relative to support structures such as members 64 and 74 using an actuator that is based on electromagnetic structures such as wire coils (electromagnetics) and/or permanent magnets, piezoelectric actuator structures, stepper motors, shape memory metal structures (e.g., actuators that move the lens carrier by heating and cooling nitinol structures), or other actuator structures. Examples of electromagnetic actuators include moving coil actuators and moving magnet actuators. Actuators that use no permanent magnets (e.g., actuators based on a pair of opposing electromagnets) may also be used.

In the illustrative configuration of FIG. 14, an actuator for camera module 22 has been formed using permanent magnets 78 and coils 80. This type of actuator arrangement, which may sometimes be referred to as a voice coil motor (VCM) arrangement, may be controlled electrically using by control signals from control circuitry within device 10 to control the amount of current flowing through coils 80.

Figure 15:
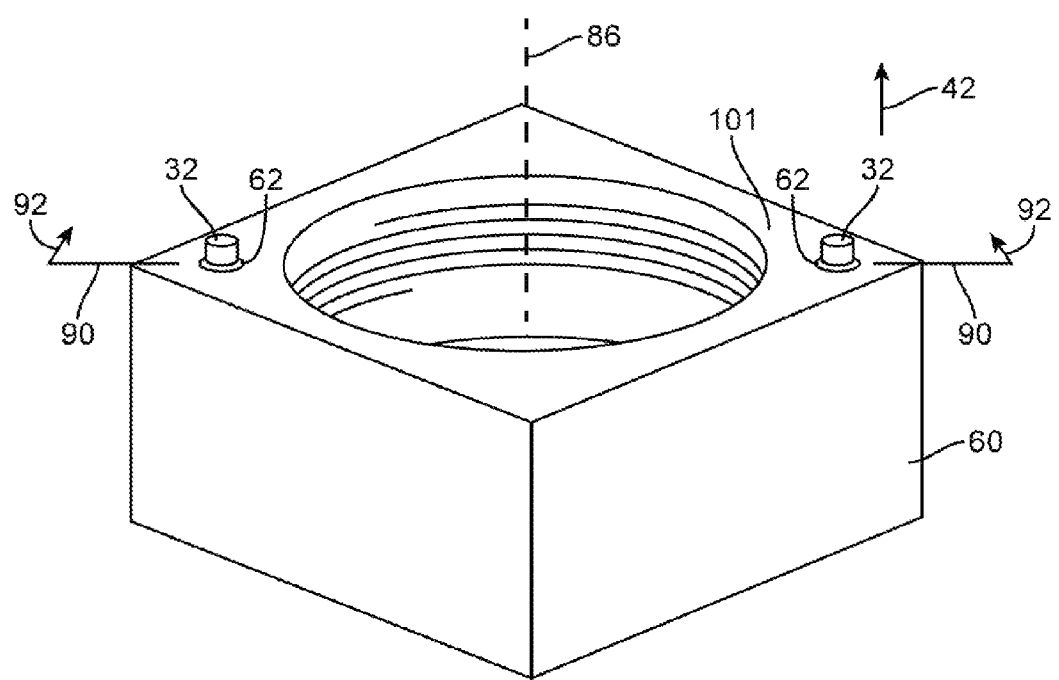
FIG. 15 is a perspective view of an illustrative camera module with alignment features in accordance with an embodiment of the present invention.

FIG. 15 is a perspective view of an illustrative camera module of the type shown in FIG. 14 in which the internal components of FIG. 14 have been encased within outer wall structures 60. Outer wall structures 60 may form a camera module housing sheet metal structures covered with optional metal coatings. Outer wall structures 60 may be formed from a ferromagnetic metal so that outer wall structures 60 serve as a ferromagnetic shield. Openings 62 in outer wall structures 60 (e.g., in lip portion 101) may allow pins 32 to protrude from member 64 upwards in direction 42.

Figure 16:
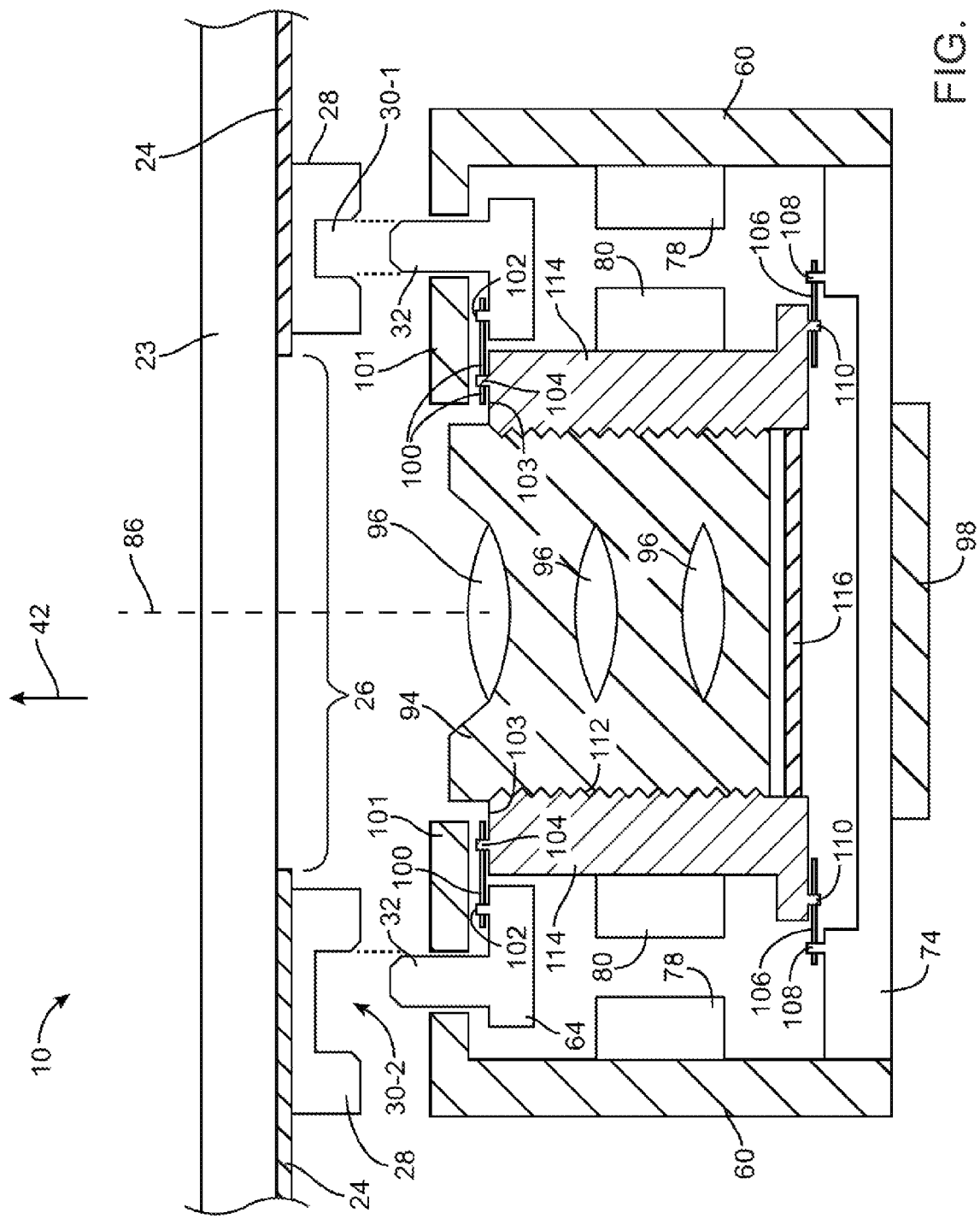
FIG. 16 is a cross-sectional side view of a camera module of the type shown in FIG. 15 in accordance with and embodiment of the present invention.

A cross-sectional view of camera module 22 of FIG. 15 taken along line 90 and viewed in direction 92 is shown in FIG. 16. As shown in FIG. 16, camera module 22 may have lens support structures formed from lens carrier structure 114 and lens barrel 94. One or more lenses such as lenses 96 may be mounted within lens barrel 94. Lens barrel 94 may have a cylindrical surface with threads 112 that mate with corresponding threads on the interior surface of a cylindrical hole in lens carrier 114. Light that passes through camera window 26 and lenses 96 is focused onto image sensor 98. An optional infrared cut filter 116 may be used to prevent infrared light from reaching sensor 98. Image sensor 98 may be attached to camera module support structures such as lower support member 74 (e.g., in a recess in member 74 or on a lower surface of support member 74).

Lens carrier 114 (and lens barrel 94 in carrier 114) may be supported for motion along lens axis 86 using flexible spring structures such as upper spring 100 and lower spring 106. Upper spring 100 may be attached to lens carrier 114 using adhesive or one or more heat stakes on lens carrier 114 such as heat stakes 104. Upper spring 100 may be attached to upper support member 64 using adhesive or one or more heat stakes on upper support member 64 such as heat stakes 102. Lower spring 106 may be attached to lens carrier 114 using adhesive or one or more heat stakes on lens carrier 114 such as heat stakes 110. Lower spring 106 may be attached to lower support member 74 using adhesive or one or more heat stakes such as heat stakes 108.

Coils 80 may be attached to lens carrier 114. Magnets 78 may be mounted on the interior surface of outer housing walls 60 (e.g., a ferromagnetic shield). Housing walls 60 may be attached to upper and lower support members 64 and 74 using adhesive, fasteners, or other suitable attachment mechanisms. During operation, current applied to coils 80 will cause coils 80 and therefore lens carrier 114 and lenses 96 to move relative to magnets 78 and upper and lower support members 64 and 74. Lip portion 101 of outer wall structures 60 may serve as a stop feature. Lip portion 101 may, for example, be contacted by upper surface 103 of lens carrier 114 during movement of lens carrier 114 in direction 42 and may thereby arrest upward motion of lens carrier 114 and lenses 96 in direction 42 to prevent over-travel of lenses 96.

With the arrangement of FIG. 16, lenses 96 are mounted in lens support structures formed from lens carrier 114 and lens barrel 94. Using springs 100 and 106, these lens support structures are coupled to internal support structures such as upper member 64 and lower member 74. Upper member 64 has pins 32 that directly mate with alignment features such as circular opening 30-1 and slot-shaped opening 30-2 in alignment ring 28, thereby aligning camera module 22 without introducing alignment tolerance variations due to the presence of outer wall structure 60. Pins 32 may also mate with other types of alignment features in device 10 if desired, as described in connection with FIGS. 3-6.

Figure 17:
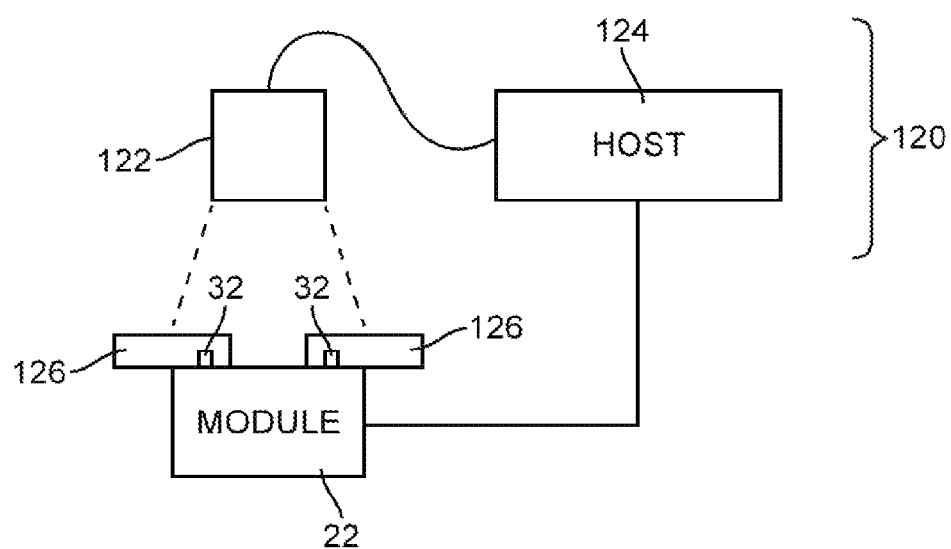
FIG. 17 is a system diagram showing illustrative test equipment of the type that may be used in characterizing camera modules in accordance with an embodiment of the present invention.

FIG. 17 is a diagram of a system of the type that may be used in testing camera modules such as camera module 22 during manufacturing. As camera module 22 is assembled during manufacturing, structures within module 22 such as image sensor 98 may be laterally and rotationally offset from their desired location. Test equipment 120 may be used in measuring module 22 to determine the magnitude of any placement offsets in the images acquired by image sensor 98 relative to alignment pins 32. Image offsets may arise, for example, because image sensor 98 and/or associated lens structures in module 22 are misaligned.

During testing, module 22 may be mounted in a test fixture such as test fixture 126. Test fixture 126 may have recesses or other alignment features that mate with alignment pins 32 on camera module 22. Test unit 124 (e.g., a computer or other control circuitry) may issue commands to test pattern generator 122 and module 22 that direct module 22 to acquire test images while test pattern generator 122 generates known test patterns of light. As test pattern generator 122 applies test patterns to module 22, test unit 124 may use image sensor 98 in module 22 to acquire the test images. Test unit 124 may then analyze the acquired digital image test data to determine the magnitude of any lateral (X, Y, and Z) offsets and rotational offsets (about X, Y, and Z axes) exhibited by image sensor 98 and/or the images acquired by image sensor 98 relative to pins 32. As an example, test equipment 120 may determine that a particular camera module has an image sensor that is tilted by 1 degree relative to its desired orientation.

Figure 18:
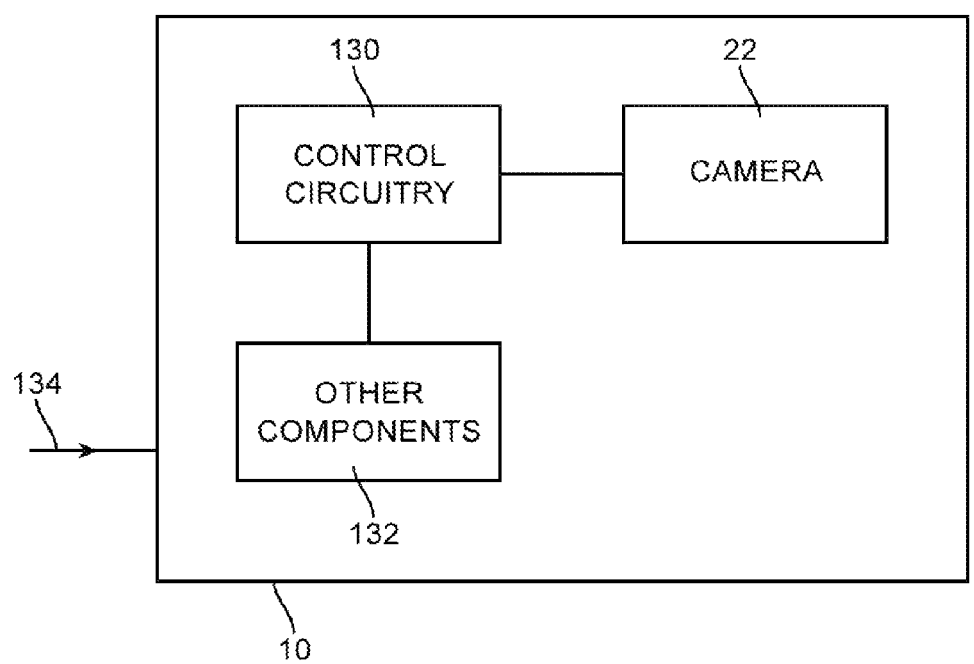
FIG. 18 is a schematic diagram of an electronic device in accordance with an embodiment of the present invention.

FIG. 18 is a schematic diagram of device 10 showing how device 10 may include control circuitry 130, camera module 22, and other components 132. Camera module 22 may be used to acquire digital image data (e.g., still images and/or video). Components 132 may include sensors, input-output devices such as touch screens, buttons, data ports, audio jacks, wireless and wired communications circuitry, displays, status indicators, and other circuitry for operating device 10.

Control circuitry 130 may include one or more processors, memory, application specific integrated circuits, and other storage and processing circuitry. Control circuitry 130 may be used to store calibration data from test equipment 120. For example, control circuitry 130 may be used to store calibration data from test equipment 120 that indicates to control circuitry 130 how much tilt or other offset a particular camera module 22 that has been installed within device 10 is exhibiting. Control circuitry 130 may be used to run software on device 10 such as operating system software and application software. The software may allow control circuitry 130 to process images from camera module 22. For example, if stored calibration data in memory in control circuitry 130 indicates that camera module 22 has an image sensor that is tilted by 1° relative to horizontal, image processing software that is implemented on control circuitry 130 can automatically rotate each acquired image by a compensating 1° in the opposite direction to ensure that final images for device 10 are not tilted.

Figure 19:
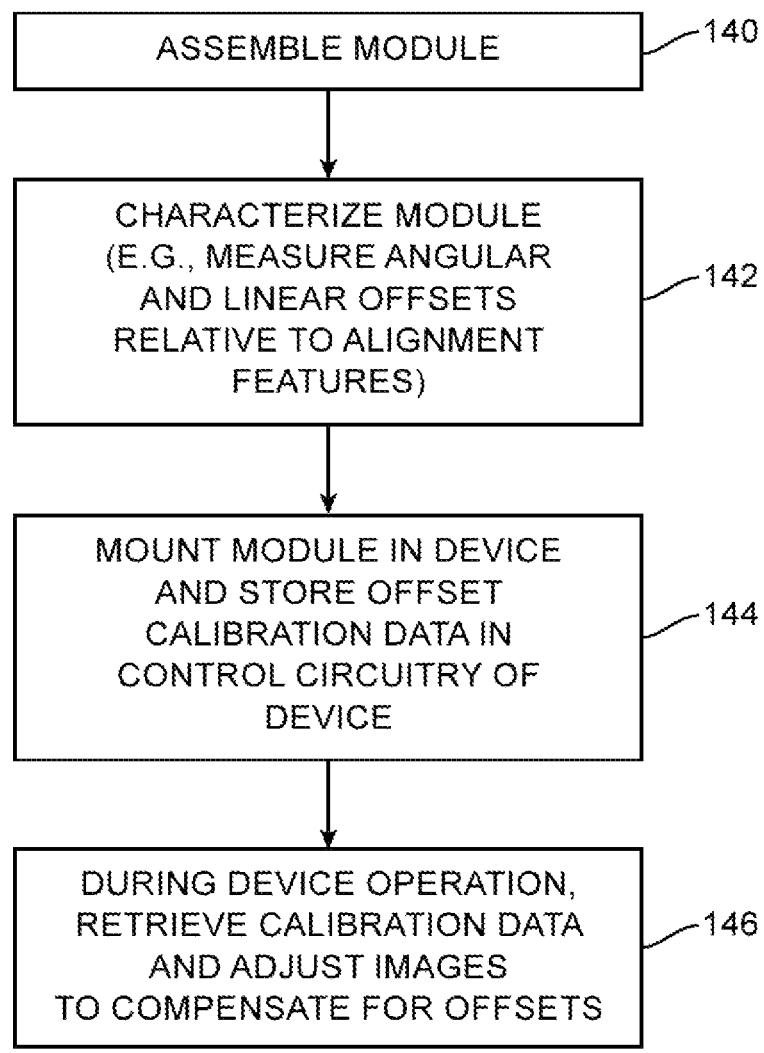
FIG. 19 is a flow chart of illustrative steps involved in fabricating, characterizing, installing, and using a camera module in an electronic device in accordance with an embodiment of the present invention.

Illustrative steps involved in calibrating electronic device 10 to compensate for offsets of image sensor 98 relative to alignment features 32 in camera module 22 and involved in using device 10 following calibration are shown in FIG. 19.

At step 140, the components of camera module 22 such as image sensor 98 and the other structures of FIG. 16 may be assembled to form camera module 22. Due to manufacturing variations, image sensor 98 and other components may not be perfectly aligned with respect to alignment features such as pins 32 on camera module 22, leading to a potential misalignment of the images produced by image sensor 98. For example, if image sensor 98 is tilted, raw images acquired by camera module 22 will also be tilted.

At step 142, test equipment such as test equipment 120 of FIG. 17 may be used to characterize the location of image sensor 98 and other components (and/or the position of acquired images) relative to alignment features 32. In particular, test equipment 120 may align camera module 22 relative to a fixture while applying a test pattern using test pattern generator 122. Computing equipment such as test host 124 of FIG. 17 may gather images from camera module 22 while the test pattern from test pattern generator 122 is being provided to image sensor 98. By processing the images that are acquired, test host 124 can ascertain how much image sensor 98 (and/or the image data acquired by module 22) is offset from its desired location. Test host 124 may then generate corresponding calibration data for compensating for the offsets that were measured. As an example, if a given camera module exhibits 0.1 mm of offset along a Y axis and 1.3° of tilt about a Z axis, calibration data that represents this lateral and rotational offset information can be stored in a database in test equipment 124 for use in calibrating that camera module when installed in an electronic device.

After camera module 22 has been characterized to determine how much image offset is associated with camera module 22, camera module 22 may be installed within housing 12 of electronic device 10. Control circuitry 130 may be coupled to computing equipment such as test equipment 124 that has access to the database of calibration data acquired during the characterizing operations of step 142. During the operations of step 144, the computing equipment may use paths such as path 134 of FIG. 18 to store the calibration data for the installed camera module that was acquired during the operations of step 142 in storage within control circuitry 130. Following calibration of the electronic device in this way, the electronic device may be shipped to an end user.

At step 146, a user of device 10 may acquire still or moving images with camera module 22. Because camera module 22 has offsets of 0.1 relative to a Y axis and a tilt of 1.3° about a Z axis (in this example), the images that are acquired will be laterally offset and tilted by a corresponding amount. However, because control circuitry 130 has been provided with calibration data, control circuitry 130 can automatically process each acquired image from camera module 22 to remove the lateral and rotational offsets. Images that are stored in control circuitry 130 for use by the user may therefore appear accurately centered and not tilted.

The foregoing is merely illustrative of the principles of this invention and various modifications can be made by those skilled in the art without departing from the scope and spirit of the invention. Any of the foregoing embodiments may be used alone or in combination with one or more of any of the other foregoing embodiments.

What is claimed is:

1. A camera module configured to be mounted in an electronic device that has alignment structures, comprising:
   lens support structures containing at least one lens;
   internal support structures;
   outer wall structures that surround and enclose at least part of the internal support structures;
   an actuator that moves the lens support structures relative to the internal support structures;
   a digital image sensor that receives light through the lens, wherein the internal support structures have alignment structures configured to mate with the alignment structures of the electronic device; and
   flexible coupling structures with which the internal support structures support the lens support structures.

2. The camera module defined in claim 1 wherein the actuator comprises a voice coil motor including a magnet and a coil and wherein the outer wall structures comprise a ferromagnetic shield.

3. The camera module defined in claim 2 wherein the alignment structures of the internal support structures comprise protrusions.

4. The camera module defined in claim 3 wherein the internal support structures comprise a plastic member and wherein the protrusions comprise pins that are integral portions of the plastic member.

5. The camera module defined in claim 4 wherein the ferromagnetic shield has openings through which the pins protrude.

6. The camera module defined in claim 3 wherein the internal support structures comprise a plastic member and wherein the protrusions of the alignment structures of the internal support structures comprise metal pins that are insert molded within the plastic member.

7. The camera module defined in claim 6 wherein the ferromagnetic shield has openings through which the pins protrude.

8. The camera module defined in claim 2 wherein the alignment structures of the electronic device comprise at least one protrusion and wherein the alignment structures of the internal support structures comprise at least one recess configured to receive the protrusion.

9. The camera module defined in claim 3, wherein the flexible coupling structures comprise at least one spring.

10. The camera module defined in claim 9 wherein the ferromagnetic shield comprises a lip configured to arrest motion of the lens support structures relative to the internal support structures.

11. An electronic device, comprising:
structures that include alignment features; and
a camera module having a ferromagnetic shield and internal support structures within the ferromagnetic shield that have portions that mate with the alignment features, wherein the ferromagnetic shield has openings and wherein the portions pass through the openings to mate with the alignment features.

12. The electronic device defined in claim 11 wherein the portions comprise alignment pins.

13. The electronic device defined in claim 12 wherein the alignment features comprise an alignment ring and wherein the alignment pins protrude into the alignment ring.

14. The electronic device defined in claim 13 wherein the camera module comprises lens structures and a voice coil motor configured to move the lens structures relative to the alignment pins.

15. The electronic device defined in claim 14 further comprising:
a display having a display cover layer with an opaque masking layer, wherein the opaque masking layer has a camera window opening, and wherein the structures that include the alignment features comprise an alignment structure having an opening that is aligned with the camera window opening.

16. The electronic device defined in claim 15 wherein the alignment structure has a recess that is configured to receive one of the alignment pins to serve as part of the alignment features.

17. The electronic device defined in claim 12 further comprising:
a housing wall having a camera window opening; and
a transparent camera window member, wherein the structures that include the alignment features comprise a camera window trim member with which the transparent camera window member is installed in the camera window opening.

18. The electronic device defined in claim 17 wherein the camera window trim member has a recess that is configured to receive one of the alignment pins to serve as part of the alignment features.

19. The electronic device defined in claim 12 further comprising:
a housing wall having a camera window opening; and
a transparent camera window member aligned with the camera window opening, wherein the housing wall has a recess that is configured to receive one of the alignment pins to serve as part of the alignment features.

20. A camera module configured to be mounted in an electronic device that has alignment structures, comprising:
lens support structures containing at least one lens;
internal support structures;
outer wall structures that surround and enclose at least part of the internal support structures;
an actuator that moves the lens support structures relative to the internal support structures; and
a digital image sensor that receives light through the lens, wherein the internal support structures have alignment structures configured to mate with the alignment structures of the electronic device, wherein the alignment structures of the internal support structures comprise protrusions, wherein the internal support structures comprise a plastic member, and wherein the protrusions of the alignment structures of the internal support structures comprise metal pins that are insert molded within the plastic member.

* * * * *